(12) United States Patent
Gao

(10) Patent No.: US 9,896,156 B2
(45) Date of Patent: Feb. 20, 2018

(54) GEAR CHANGING CONTROL APPARATUS

(71) Applicant: Shimano Inc., Sakai, Osaka (JP)

(72) Inventor: Jun Gao, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/661,419

(22) Filed: Mar. 18, 2015

(65) Prior Publication Data
US 2015/0307157 A1 Oct. 29, 2015

(30) Foreign Application Priority Data
Apr. 28, 2014 (JP) ................. 2014-092903

(51) Int. Cl.
*B62M 9/122* (2010.01)
*B62M 6/45* (2010.01)
*F16H 61/70* (2006.01)

(52) U.S. Cl.
CPC .......... *B62M 9/122* (2013.01); *B62M 6/45* (2013.01); *F16H 61/702* (2013.01); *F16H 2306/40* (2013.01)

(58) Field of Classification Search
CPC ....... B62M 9/122; B62M 6/45; F16H 61/702; F16H 2306/40
See application file for complete search history.

(56) References Cited

U.S. PATENT DOCUMENTS

| 6,015,021 A * | 1/2000 | Tanaka | B62M 6/45 180/206.2 |
| 6,767,308 B2 * | 7/2004 | Kitamura | B62K 25/04 180/220 |
| 6,877,755 B2 * | 4/2005 | Takamoto | B62M 25/04 280/260 |
| 6,926,637 B2 * | 8/2005 | Uno | B62M 25/04 474/70 |
| 7,062,980 B2 * | 6/2006 | Takamoto | B62M 25/08 73/862.31 |
| 8,882,122 B2 * | 11/2014 | Emura | B62M 25/08 280/200 |
| 9,151,379 B2 * | 10/2015 | Kuroda | B62M 25/04 |
| 9,243,692 B2 * | 1/2016 | Wesling | F16H 9/06 |
| 2012/0265414 A1 | 10/2012 | Cheng | |
| 2013/0054067 A1 * | 2/2013 | Shoge | B62M 6/45 701/22 |

(Continued)

FOREIGN PATENT DOCUMENTS

| JP | 2617059 B2 | 6/1997 |
| JP | 2000-38187 A | 2/2000 |
| JP | 2003-120799 A | 4/2003 |

(Continued)

*Primary Examiner* — Jacob S. Scott
*Assistant Examiner* — Tinh Dang
(74) *Attorney, Agent, or Firm* — Global IP Counselors, LLP

(57) ABSTRACT

A gear changing control apparatus is provided for controlling a plurality of operation modes of a drive unit of an electric transmission that assists a manual drive force of a bicycle. The control apparatus includes a controller. The controller selects a gear changing range that can be used according to a selected operation mode from a plurality of operation modes. The controller controls the electric transmission within the gear changing range that is selected.

17 Claims, 9 Drawing Sheets

(56) References Cited

U.S. PATENT DOCUMENTS

2013/0054068 A1* 2/2013 Shoge ................... B62M 6/45
　　　　　　　　　　　　　　　　　　　701/22

FOREIGN PATENT DOCUMENTS

| JP | 2004-268854 A | 9/2004 |
| JP | 2010-30539 A | 2/2010 |
| JP | 2014-015211 A | 1/2014 |
| JP | 2015-209200 A | 11/2015 |

* cited by examiner

| SHIFT POSITION | UPSHIFTING THRESHOLD VALUE (TD) (km/h) | | DOWNSHIFTING THRESHOLD VALUE (TD) (km/h) | |
|---|---|---|---|---|
| 1 | 8 | TU(1) |  | TD(1) |
| 2 | 12.2 | TU(2) | 8.5 | TD(2) |
| 3 | 16.4 | TU(3) | 10.7 | TD(3) |
| 4 | 20.5 | TU(4) | 14.6 | TD(4) |
| 5 |  | TU(5) | 18.5 | TD(5) |

FIG. 3

|  |  |  | FC | | |
|---|---|---|---|---|---|
|  |  |  | 24 | 32 | 42 |
|  |  |  | Low | Mid | Top |
| CS | 36 | 1ST GEAR | 0.67 | 0.89 | 1.17 |
|  | 32 | 2ND GEAR | 0.75 | 1.00 | 1.31 |
|  | 28 | 3RD GEAR | 0.86 | 1.14 | 1.50 |
|  | 24 | 4TH GEAR | 1.00 | 1.33 | 1.75 |
|  | 21 | 5TH GEAR | 1.14 | 1.52 | 2.00 |
|  | 19 | 6ST GEAR | 1.26 | 1.68 | 2.21 |
|  | 17 | 7TH GEAR | 1.41 | 1.88 | 2.47 |
|  | 15 | 8TH GEAR | 1.60 | 2.13 | 2.80 |
|  | 13 | 9TH GEAR | 1.85 | 2.46 | 3.23 |
|  | 11 | 10TH GEAR | 2.18 | 2.91 | 3.82 |

FIG. 7

GEAR CHANGING CONTROL APPARATUS

CROSS-REFERENCE TO RELATED APPLICATIONS

This application claims priority under 35 U.S.C. § 119 to Japanese Patent Application No. 2014-092903, filed Apr. 28, 2014. The entire disclosure of Japanese Patent Application No. Apr. 28, 2014 is hereby incorporated herein by reference.

BACKGROUND

Field of the Invention

This invention generally relates to a control apparatus. More specifically, the present invention relates to a gear changing control apparatus that controls a gear changing device of a bicycle according to a plurality of operation modes of an auxiliary power device that is provided to the bicycle and that assists a manual drive force.

Background Information

Assisted bicycles are provided with a drive unit having a motor for generating an auxiliary force. On example of a conventional assisted bicycle is disclosed in Japanese Patent No. 3,306,309. The assisted bicycle disclosed in this Japanese Patent can be switched between a plurality of types of auxiliary forces with a switch.

SUMMARY

One object of the present invention is to improve the riding comfort in an assisted bicycle.

The gear changing control apparatus according to the present invention is a gear changing control apparatus that controls a gear changing device of a bicycle according to a plurality of operation modes of an auxiliary power device that is provided to a bicycle and that assists the manual drive force. The gear changing control apparatus comprises a gear changing controller. The gear changing controller selects a gear changing range that can be used according to a plurality of operation modes and that controls the gear changing device within the selected gear changing range.

In this gear changing control apparatus, the gear changing controller selects a gear changing arrangement that can be used according to a plurality of operation modes of the auxiliary power device and that controls the gear changing device within the selected gear changing range. Therefore, improving the riding comfort in an assisted bicycle is possible.

The plurality of operation modes comprises a first operation mode and a second operation mode. The gear changing controller varies at least a part of the gear changing range that can be used in the first operation mode and the gear changing range that can be used in the second operation mode. In this case, since at least a part of the gear changing range is different between the first operation mode and the second operation mode, selecting a gear changing range according to the operation mode is possible.

The gear changing controller can control the gear changing device so that the maximum gear ratio that can be used during the second operation mode is larger than the maximum gear ratio that can be used during the first operation mode.

The gear changing controller can control the gear changing device so that the minimum gear ratio that can be used during the second operation mode is larger than the minimum gear ratio that can be used during the first operation mode.

The first operation mode can be an operation mode that assists the manual drive force with a first auxiliary force, and the second operation mode can be an operation mode that assists the manual drive force with a second auxiliary force that is larger than the first auxiliary force.

The first operation mode can be an operation mode that does not make the auxiliary power device generate an auxiliary force, and the second operation mode can be an operation mode that does make the auxiliary power device generate an auxiliary force.

The gear changing range can be defined by the gear ratio or the shift position. In this case, the gear changing range becomes clear.

The gear changing controller can control the gear changing device in response to a gear changing command. In this case, the controller can control the gear changing device based on a gear changing command that is generated by a gear changing operation or based on a gear changing command that is generated by the traveling state of the bicycle.

The gear changing control apparatus can further comprise a traveling state detecting unit that detects the traveling state of the bicycle. The gear changing controller controls the gear changing device according to the detection result of the traveling state detecting unit. In this case, conducting an automatic gear shift control according to the traveling state is possible.

A gear changing control apparatus according to another aspect of the present invention is a gear changing control apparatus that controls a gear changing device of a bicycle according to a plurality of operation modes of an auxiliary power device that is provided to a bicycle and that assists the manual drive force. The plurality of operation modes comprises a first operation mode and a second operation mode. The gear changing control apparatus comprises a gear changing controller. When the speed of the bicycle becomes less than or equal to a prescribed value, the gear changing controller controls the gear changing device to be in a first gear changing state corresponding to the first operation mode when in the first operation mode. The controller controls the gear changing device to be in a second gear changing state that is different from the first gear changing state and corresponding to the second operation mode when in the second operation mode.

In this gear changing control apparatus, since the gear changing device is controlled to be in a different gear changing state when the speed of the bicycle becomes less than or equal to a prescribed value in the first operation mode and the second operation mode, in which the auxiliary force is different, when the rider pedals after the speed becomes less than or equal to the prescribed value, the rider can comfortably start the bicycle, and the riding comfort of the assisted bicycle can be improved.

The prescribed value can be 0. In this case, the rider can comfortably start the bicycle when the rider pedals after the bicycle has been stopped, and the riding comfort of the assisted bicycle can be improved.

The gear ratio in the first gear changing state can be smaller than the gear ratio in the second gear changing state.

A gear changing control apparatus according to yet another aspect of the present invention is a device that controls a gear changing device of a bicycle according to a plurality of operation modes of an auxiliary power device that is provided to a bicycle and that assists the manual drive force. The plurality of operation modes comprises a first operation mode and a second operation mode. The gear changing control apparatus comprises a gear changing controller that controls the gear changing device, according to a first parameter related to time and the traveling state of the bicycle when in the first operation mode, and that controls the gear changing device, according to a second parameter related to time and that is different from the first parameter and the traveling state of the bicycle when in the second operation mode.

In this gear changing control apparatus, the gear changing device is controlled according to different parameters related to time when in the first operation mode and the second operation mode. For example, in the case that the auxiliary force of the second operation mode is larger than that of the first operation mode, by making the length of the first parameter related to time shorter than the length of the second parameter related to time, the gear changing frequency of the second operation mode with a larger auxiliary force can be reduced, and the gear changing frequency of the first operation mode with a small auxiliary force can be increased. With this, an optimum gear changing frequency according to the operation mode can be obtained, which will improve the riding comfort of the assisted bicycle.

The gear changing controller can shift the gear changing device when a prescribed condition is still being met even after a period of time expressed by the first parameter has elapsed from the time that the traveling state of the bicycle satisfies the prescribed condition when in the first operation mode. The controller can also shift the gear changing device when a prescribed condition is still being met even after a period of time expressed by the second parameter has elapsed from the time that the traveling state of the bicycle satisfies the prescribed condition when in the second operation mode.

The gear changing controller does not have to shift the gear changing device when a prescribed condition is not being met after a period of time expressed by the first parameter has elapsed from the time that the traveling state of the bicycle satisfies the prescribed condition when in the first operation mode. The controller also does not have to shift the gear changing device when a prescribed condition is not being met after a period of time expressed by the second parameter has elapsed from the time that the traveling state of the bicycle satisfies the prescribed condition when in the second operation mode.

The time expressed by the first parameter can be shorter than the time expressed by the second parameter.

The traveling state of the bicycle can be selected from a group comprising the speed of the bicycle, the cadence of the crank, the manual drive force, and the inclination of the bicycle in the traveling direction. In this case, the gear changing device will automatically shift gears according to the traveling state of the bicycle, so that a gear changing operation becomes unnecessary.

The gear changing controller can control the gear changing device according the first parameter, the second parameter, and the traveling state of the bicycle, regarding shifting in the direction in which the gear ratio becomes smaller. In this case, in the so-called downshifting, the gear changing frequency can be changed according to the auxiliary force.

According to the present invention, the riding comfort of an assisted bicycle can be improved in an assisted bicycle having an auxiliary power device that operates in a plurality of operation modes since the gear changing range, the gear changing state, or the gear changing frequency will change for each of the operation modes. Also other objects, features, aspects and advantages of the disclosed gear changing control apparatus will become apparent to those skilled in the art from the following detailed description, which, taken in conjunction with the annexed drawings, discloses one embodiment of the gear changing control apparatus.

BRIEF DESCRIPTION OF THE DRAWINGS

Referring now to the attached drawings which form a part of this original disclosure;

FIG. 3 is a table showing one example of an upshifting threshold value and a downshifting threshold value for each shift position of an internal gear changing mechanism;

FIG. 7 is a diagram showing one example of a gear ratio in the case that the gear changing range is defined by the gear ratio in a gear changing device having three front sprockets and ten rear sprockets;

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
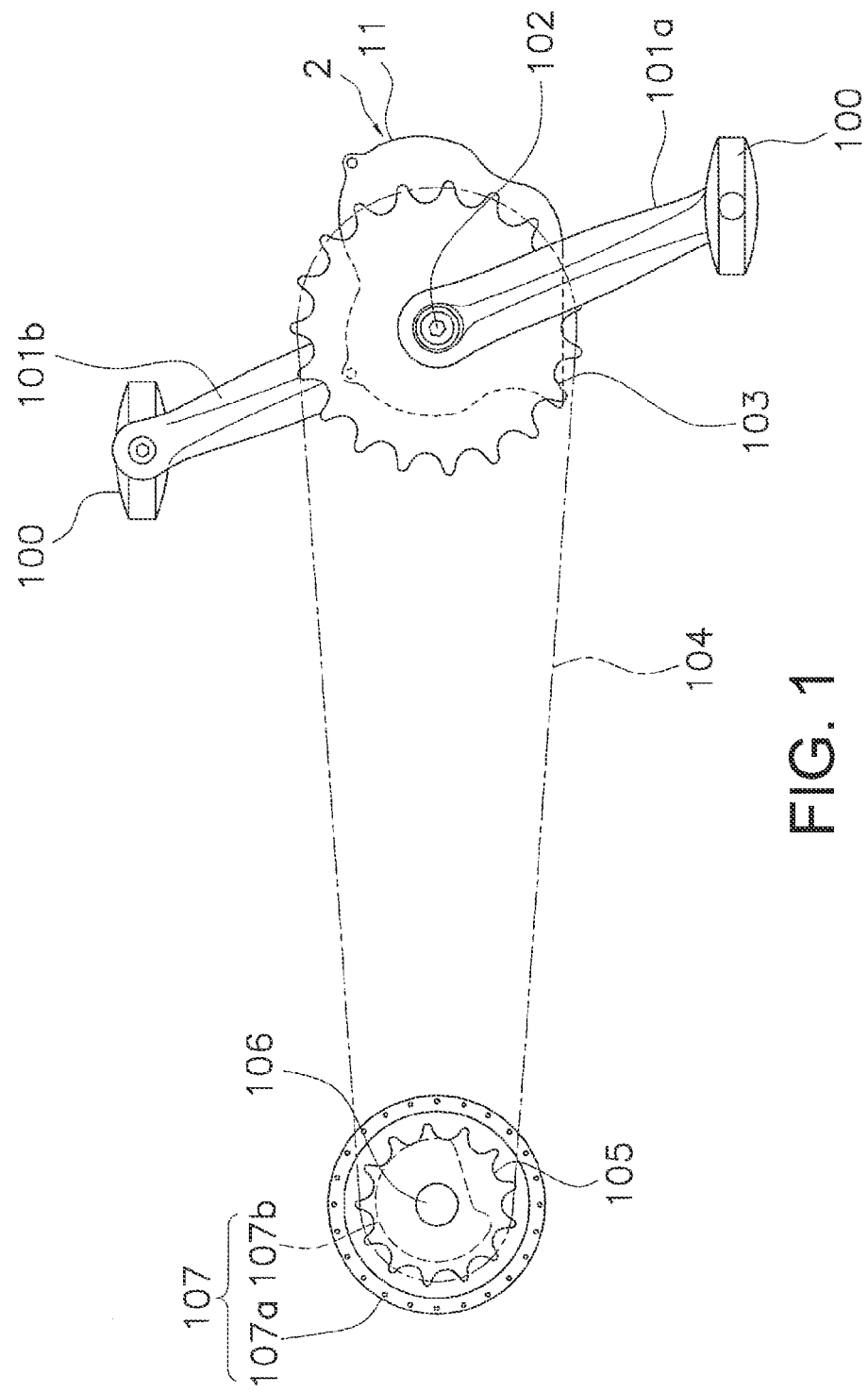
FIG. 1 is a side elevational view of a bicycle drive train of a power-assisted bicycle that that is equipped with a gear changing control apparatus in accordance with a first embodiment.

Referring initially to FIG. 1, a power-assisted bicycle drive train is illustrated that incorporates a bicycle control apparatus 1 according to a first embodiment. The power-assisted bicycle drive train includes a drive unit 2 that is controlled by the bicycle control apparatus 1. The drive unit 2 assists a pedaling force that acts on a pair of pedals 100. One of the pedals 100 is mounted on a crank arm 101a, while the other pedal 100 is mounted on a crank arm 101b. The crank arms 101a and 101b are mounted on a crankshaft 102. A front sprocket 103 is also mounted on the crankshaft 102 via the drive unit 2. A chain 104 is engaged with the front sprocket 103 and a rear sprocket 105 that is attached to an axle 106 of a rear wheel (not shown). An electric transmission 107 is mounted to the rear sprocket 105. Thus, the power-assisted bicycle drive train transmits the pedaling force that acts on the pedals 100 to the internal gear changing mechanism 107a of the electric transmission 107.

Specifically, the internal gear changing mechanism 107a is provided around the axle 106 of the rear wheel. The internal gear changing mechanism 107a receives the pedaling (drive) force via a path from the crank arm 101a (or the crank arm 101b)→the crankshaft 102→the drive unit 2→the front sprocket 103→the chain 104→the rear sprocket 105. The pedaling force is one example of the manual drive force. The drive unit 2 is one example of the auxiliary power device. The bicycle control apparatus 1 is one example of a bicycle gear changing control apparatus.

Figure 2:
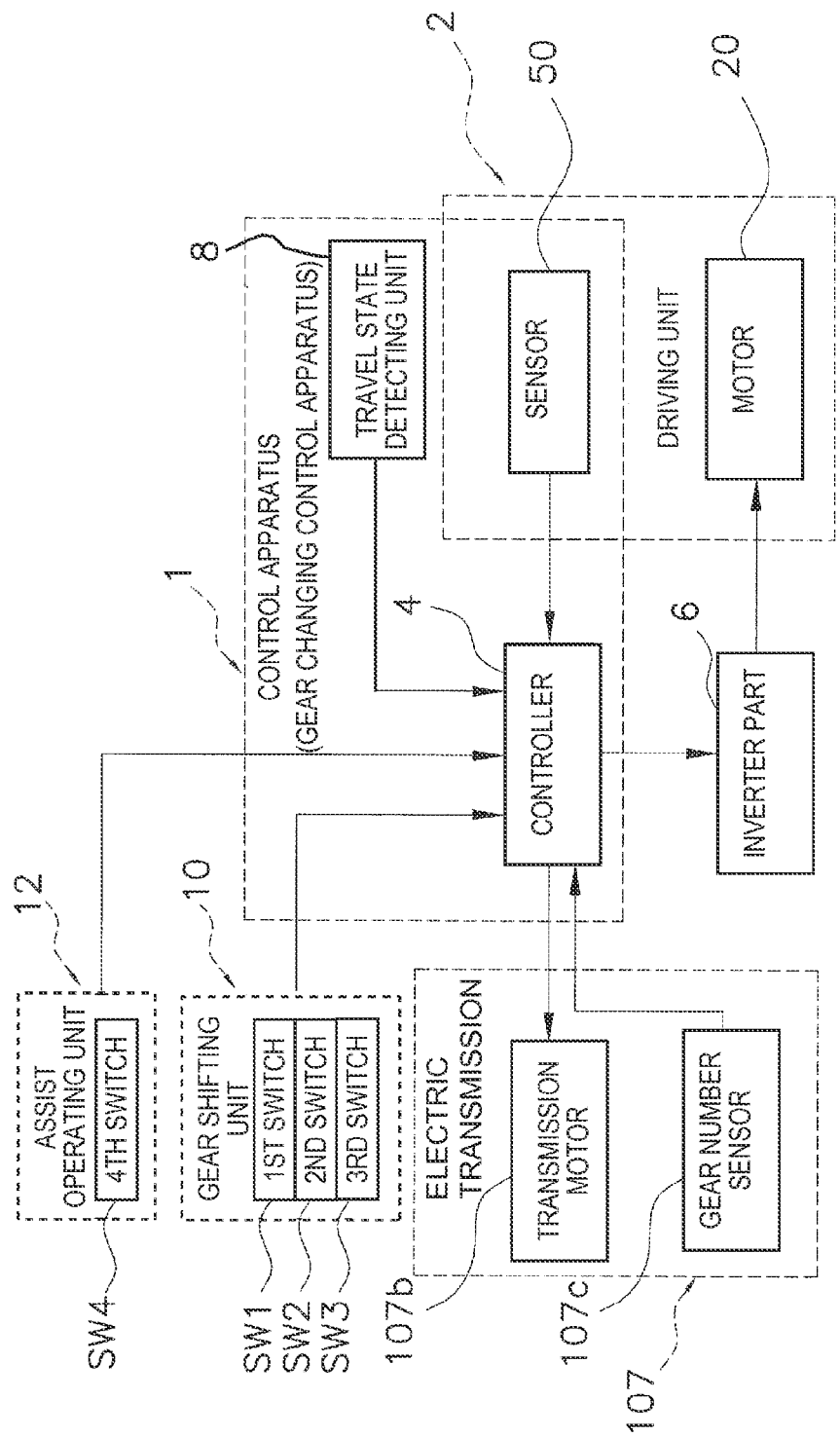
FIG. 2 is a block diagram showing an overall configuration of the gear changing control apparatus comprising a drive unit.

The drive unit 2 comprises a casing 11 and a motor 20. The motor is disposed in the casing 11 (refer to FIG. 2). The motor 20 is provided to assist the pedaling force. The crankshaft 102 is rotatably supported by the casing 11. The drive unit 2 transmits the driving force of the motor 20 to the front sprocket 103. For example, the electric transmission 107 basically comprises an internal gear changing mechanism 107a and a gear shift motor 107b. The internal gear changing mechanism 107a shifts gears using the gear shift motor 107b. The electric transmission 107 is one example of the gear changing mechanism. Also, as shown in FIG. 2, the electric transmission 107 further comprises a gear number sensor 107c that is configured to detect the shift position of the internal gear changing mechanism 107a. The internal gear changing mechanism 107a comprises a plurality of shift positions. The internal gear changing mechanism 107a comprises five shift positions in the present embodiment. For each shift position in the internal gear changing mechanism 107a, the gear ratio is, for example, about 0.5 for the first shift position, about 0.8 for the second shift position, about 1.2 for the third shift position, about 1.6 for the fourth shift position, and about 2.1 for the fifth shift position.

The power-assisted bicycle combines the output of the motor 20 with the pedaling force as the auxiliary force and assists riding. In the present embodiment, a sensor 50 detects the pedaling force of the rider. When the detected value exceeds a set value. The sensor 50 activates the motor 20, which generates a force corresponding to the pedaling force as the auxiliary force. The motor 20 of the drive unit 2 for assisting is generally disposed near a connection portion of a bottom end portion of a seat tube and a rear end portion of a down tube of a frame for assisting in the pedaling force. The drive unit 2 is fixed to the frame by bolts that are not shown. A battery is disposed along a rear carrier, the down tube, or the seat tube for supplying electrical power for driving the motor.

Electric Configuration

FIG. 2 is a block diagram showing an electric configuration of a power-assisted bicycle comprising the drive unit 2. The power-assisted bicycle comprises the bicycle control apparatus 1, the drive unit 2 and the electric transmission 107, as well as an inverter 6, a gear shifting unit 10 and an assist operating unit 12. The bicycle control apparatus 1 comprises a gear changing control apparatus. The bicycle control apparatus 1 and the inverter 6 can be disposed in the drive unit 2. Additionally, at least one of the bicycle control apparatus 1 and the inverter 6 can be provided in the inner or the outer peripheral part of the casing 11 of the drive unit 2.

The bicycle control apparatus 1 comprises a controller 4, a traveling state detecting unit 8 and the sensor 50. The controller 4 comprises, for example, a central processing unit (CPU) and a memory that stores a prescribed control program. The controller 4 has information regarding the correlation between a command that is output to the inverter 6 for driving the motor 20 and a torque that the motor 20 outputs in response to this command. The correlation information can be represented in the form of a table or a formula. With this, the controller 4 can determine the output torque of the motor 20. The sensor 50 detects a torque that combines the output of the motor 20 and a torque of the crankshaft 102. Therefore, the controller 4 can calculate just the pedaling force based on the torque that combines the output of the motor 20 detected by the sensor 50 and a torque of the crankshaft 102, as well as the output torque of the motor 20. With this, the controller 4 can control the drive unit 2 according to the pedaling force. The controller 4 can estimate the driving force for the motor 20 by measuring the electric current flowing through the motor 20. Alternatively, the controller 4 can estimate the driving force of the motor 20 based on the command value to the motor 20. The sensor 50 can be configured to detect the torque of the crankshaft 102, i.e., the manual drive force.

The controller 4 controls the motor 20 via the inverter 6 according to the pedaling force and a detection result of the traveling state detecting unit 8. In the first embodiment, the controller 4 controls the motor 20 via the inverter 6 in one of the plurality of operation modes. In the present embodiment, the operation modes comprises a first operation mode and a second operation mode. The first operation mode is an operation mode that assists driving with a first auxiliary force. The second operation mode is an operation mode that assists driving with a second auxiliary force that is larger than the first auxiliary force of the first operation mode. The first auxiliary force increases to the maximum, for example, to the same value as the pedaling force. The second auxiliary force also increases to the maximum, for example, to twice the pedaling force. Meanwhile, the first auxiliary force can be 0. That is, in the first operation mode, an auxiliary force by the motor 20 does not have to be generated.

The controller 4 also controls the electric transmission 107 according to the operation mode of the drive unit 2, the output of the traveling state detecting unit 8, and the detection result of the gear number sensor 107c. The controller 4 is one example of the gear changing controller. In the first embodiment, the controller selects a gear changing range of the electric transmission 107 that can be used according to the first operation mode and the second operation mode. The controller controls the electric transmission 107 within the selected gear changing range. The controller 4 varies at least a part of the gear changing range that can be used in the first operation mode and the gear changing range that can be used in the second operation mode. The controller 4 controls the electric transmission 107 so that the maximum gear ratio that can be used during the second operation mode is larger than the maximum gear ratio that can be used during the first operation mode. The controller 4 controls the electric transmission 107 so that the minimum gear ratio that can be used during the second operation mode is larger than the minimum gear ratio that can be used during the first operation mode. The gear changing range is defined by the shift position or the gear ratio. In the first embodiment, the gear changing range is defined by the shift position. The controller 4 controls the electric transmission 107 by the gear changing command. The gear changing command is output in response to a switch operation or the traveling state of the bicycle.

The traveling state detecting unit 8 detects a traveling state selected from a group comprising the speed of the bicycle, the cadence of the crank, the pedaling force (the manual drive force), and the inclination of the bicycle in the traveling direction. In the first embodiment, the traveling state detecting unit 8 detects the speed of the bicycle. The traveling state detecting unit 8 comprises, for example, a magnet that is provided to the front wheel or the rear wheel, as well as a magnetic sensor that is provided to the frame and that detects the magnet. In this case, the speed of the bicycle is detected from the timing at which the magnetic sensor detects the magnet and the circumference of the wheel. Meanwhile, the traveling state detecting unit 8 may detect the rotational speed of the crankshaft 102. For example, the traveling state detecting unit 8 comprises a magnet that is provided to crank arms 101*a* and 101*b* or the crankshaft, as well as a magnetic sensor that is disposed to the drive unit 2 in the periphery of the crankshaft 102. In this case, the cadence of the crank can be detected from the output of the magnetic sensor. Meanwhile, since the rotational speed of the wheel is calculated from a value that multiplies the gear ratio to the cadence, the speed of the bicycle can be detected by multiplying the circumference of the rear wheel by the rotational speed. Conversely, the cadence can be detected by dividing the speed of the bicycle by the circumference of the rear wheel and the gear ratio.

The motor 20 is realized by, for example, a three-phase brushless DC motor and is driven by the inverter 6. The inverter 6 converts DC to three-phase AC by a switching control, based on a command from the controller 4.

The electric transmission 107 comprises a gear changing mechanism and an electric actuator. In the first embodiment, the internal gear changing mechanism 107*a*, and the motor 107*b* (e.g. an electric actuator) constitutes the gear changing mechanism. The gear changing mechanism can be an exterior gear changing mechanism. The electric actuator can be a solenoid. The gear shift motor 107*b* operates the internal gear changing mechanism 107*a* in response to a gear changing command from the controller 4.

The gear shifting unit 10 comprises, for example, three switches, a first switch SW1, a second switch SW2, and a third switch SW3. The gear shifting unit 10 gives a gear changing command and a switching command between manual shifting and automatic shifting. The controller 4 controls the electric transmission 107 by two gear shifting modes, a manual shifting mode and an automatic shifting mode. The first switch SW1 is used for outputting an upshifting gear changing command in which the gear ratio becomes larger when in, for example, the manual shifting mode. The second switch SW2 is used for outputting a downshifting gear changing command to the controller 4 so that the gear ratio becomes smaller when in, for example, the manual shifting mode. The third switch SW3 is used for outputting a command to switch modes between, for example, the manual shifting mode and the automatic shifting mode to the controller 4. The third switch SW3 is also used for changing parameters used in the control. Meanwhile, the function of each switch from SW1 to SW3 can be freely set by software. In the manual shifting mode, the controller 4 controls the gear shifting motor 107*b* in response to the gear changing command from the gear shifting unit 10 and the operation mode of the drive unit 2. In the automatic shifting mode, the controller 4 controls the electric transmission 107 in response to the detection result of the traveling state detecting unit 8 and the operation mode of the drive unit 2.

In the automatic shifting mode, for example, a gear changing command is generated by comparing an upshifting threshold value TU and a downshifting threshold value TD for each shift position, as shown by way of an example in FIG. 3, and the gear changing command is output to the electric transmission 107. Here, the upshifting threshold values TU(1)-TU(4) from the first shift position to the fourth shift position are, for example, 8 km/h, 12.2 km/h, 16.4 km/h, and 20.5 km/h. The downshifting threshold values TD(5)-TD(2) from the fifth shift position to the second shift position are, for example, 18.5 km/h, 14.6 km/h, 10.7 km/h, and 8.5 km/h. The upshifting threshold values and the downshifting threshold values can be freely set according to the physical strength of the rider, the use of the bicycle, the number of shift positions, etc. Upshifting in the present embodiment is a gear shift that increases the gear ratio, and downshifting is a gear shift that decreases the gear ratio.

In the first embodiment, the controller 4 selects a gear changing range of the electric transmission 107 that can be used according to the detected value of the traveling state detecting unit 8 and the operation mode, and the controller controls the electric transmission 107 to be within the selected gear changing range. The controller 4 varies at least a part of the gear changing range that can be used in the first operation mode and the gear changing range that can be used in the second operation mode. Specifically, the controller 4 controls the electric transmission 107 so that the maximum gear ratio that can be used during the second operation mode is larger than the maximum gear ratio that can be used during the first operation mode. Additionally, the controller 4 controls the electric transmission 107 so that the minimum gear ratio that can be used during the second operation mode is larger than the minimum gear ratio that can be used during the first operation mode.

For example, in the second operation mode, the controller 4 is programmed to control the internal gear changing mechanism 107*a* in a gear changing range between the second shift position and the fifth shift position of the five shift positions of the internal gear changing mechanism 107*a*. For example, in the first operation mode, the controller 4 is programmed to control the internal gear changing mechanism 107*a* within a gear changing range between the first shift position and the fourth shift position of the five shift positions of the internal gear changing mechanism 107*a*.

Additionally, the controller 4 controls the gear changing state in response to the operation mode when the speed of the bicycle becomes less than or equal to a prescribed value. The prescribed value includes zero, which is a stopped state. Meanwhile, the prescribed value can be a value other than zero. For example, this value can be a value that is less than or equal to 5 km per hour. When the speed of the bicycle becomes less than or equal to the prescribed value, the controller 4 controls the electric transmission 107 to be in a first gear changing state corresponding to the first operation mode when in the first operation mode. The controller also controls the electric transmission 107 to be in a second gear changing state that is different from the first gear changing state and corresponding to the second operation mode when in the second operation mode. The first gear changing state is a gear changing state in which the gear ratio is smaller than the second gear changing state.

In the first embodiment, the first gear changing state is, for example, the first shift position, and the second gear changing state is, for example, the third shift position. The settings of at least one of the shift position corresponding to the first gear changing state and the shift position corresponding to the second gear changing state can be selectively changed by a user. For example, one of the switches of either the gear shifting unit 10 or the assist operating unit 12 can configured to act as an input unit, which can change at least either the shift position corresponding to the first gear changing state or the shift position corresponding to the second gear changing state by operating the switch. Additionally, an external settings device serving as the input unit can be connected to the controller 4 via an interface, and the shift positions corresponding to each of the gear changing states can be freely changed by the external settings device. The external settings device can be, for example, a cycle computer, a small portable electronic device such as a smartphone, or a personal computer.

In the first embodiment, controlling the gear changing range is applied to both shifting modes, the manual shifting mode and the automatic shifting mode. Meanwhile, controlling the gear changing range according to the operation mode can be applied to only one of the shifting modes, either the manual shifting mode or the automatic shifting mode. The controlling the gear changing state according to the operation mode is applied to the manual shifting mode.

The assist operating unit 12 is configured, for example, to comprise a fourth switch SW4, and this unit gives a command to switch the operation mode to the controller 4. For example, the first operation mode and the second operation mode are switched every time the fourth switch SW4 is operated. Meanwhile, the first switch SW1 to the fourth switch SW4 can be switches that the rider can directly operate, such as a push button or a toggle switch, etc. However, they can also be switches that the rider can operate via an operating member, or a touch panel.

The operation mode and the shifting mode are, for example, displayed on a display device that is provided to a handle bar. The display device can be, for example, a liquid crystal display device that is provided to a cycle computer or a light emitting device, such as a light emitting diode. In the case of a light emitting device, the configuration can allow for the display of various modes (for example, the operation mode and the shifting mode) by color or blinking, etc.

Next, referring to the control flowcharts shown in FIGS. 4 to 6 and FIGS. 8 and 9, one example of a specific gear changing control process that is executed by the controller 4 will be explained in accordance with the first embodiment. Meanwhile, the gear changing control process is not limited to the processes shown in these control flowcharts.

Figure 4:
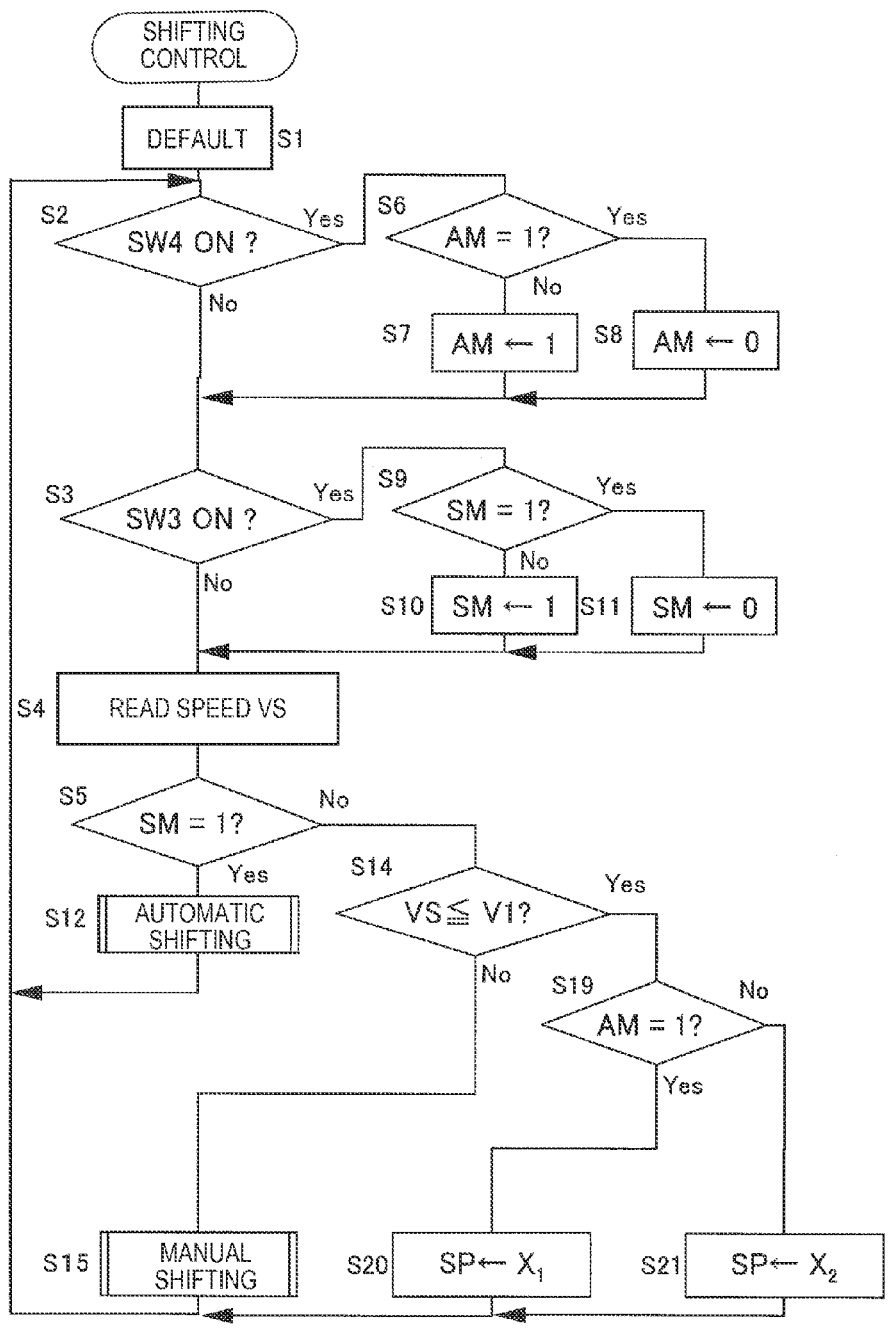
FIG. 4 is a flowchart showing one example of a control process executed by the gear changing controller according to the first embodiment of the present invention.

In FIG. 4, when power is supplied to the bicycle control apparatus 1 and the controller 4 goes into an operable state, in Step S1, the controller 4 conducts an initialization process, in which various flags and values are reset. Here, at least two types of flags are prepared, a flag AM and a flag SM. Flag AM is a flag to identify whether the operation mode is the first operation mode or the second operation mode. The flag AM is set when the second operation mode is selected by the fourth switch SW4, and the flag AM is reset if the flag AM is selected. Meanwhile, in the explanation below, setting a flag is presented with a "1", and resetting a flag is represented with a "0". The flag SM is a flag to identify whether or not the shifting mode is the manual shifting mode or the automatic shifting mode. The flag SM is set when the automatic shifting mode is selected by the third switch SW3, and the flag SM is reset when the manual shifting mode has been selected. Therefore, by default, when the power is turned on, the operation mode will be the first operation mode, and the shifting mode will be the manual shifting mode. Here, the operation mode is the first operation mode, and the shifting mode is the manual shifting mode when the power is turned on. However, the flags that are set immediately before turning the power off can be stored, and those flags can be set when turning the power on.

In Step S2, the controller 4 determines whether or not the fourth switch SW4 has been operated. If the controller 4 determines that the fourth switch SW4 has not been operated, then the operation proceeds to Step S3. In Step S3, the controller 4 determines whether or not the third switch SW3 has been operated. If the controller 4 determines that the third switch SW3 has not been operated, then the operation proceeds to Step S4. In Step S4, the controller reads the speed VS from the traveling state detecting unit 8. In Step S5, the controller 4 determines whether or not the automatic shifting mode has been set.

If the controller 4 determines that the fourth switch SW4 has been operated, then the operation proceeds from Step S2 to Step S6. In Step S6, the controller 4 determines whether or not the flag AM has been set, that is, whether or not the current operation mode is the second operation mode. In the case that the current operation mode is not the second operation mode, the controller proceeds from Step S6 to Step S7, sets the flag AM, and changes the operation mode to the second operation mode. In the case that the flag AM has been set, the controller 4 proceeds from Step S6 to Step S8, resets the flag AM, and changes the operation mode to the first operation mode. Once these settings are completed, the controller 4 proceeds to Step S3.

If the controller 4 determines that the third switch SW3 has been operated, then the operation proceeds from Step S3 to Step S9. In Step S9, the controller 4 determines whether or not the flag SM has been set, that is, whether or not the current shifting mode is the automatic shifting mode. In the case that the current shifting mode is not the automatic shifting mode, the controller 4 advances the operation from Step S9 to Step S10, sets the flag SM, and changes the shifting mode to the automatic shifting mode. In the case that the flag SM has been set, the controller 4 advances the operation from Step S9 to Step S11, resets the flag SM, and changes the shifting mode to the automatic shifting mode. Once these settings have been completed, the controller 4 proceeds to Step S4.

Figure 5:
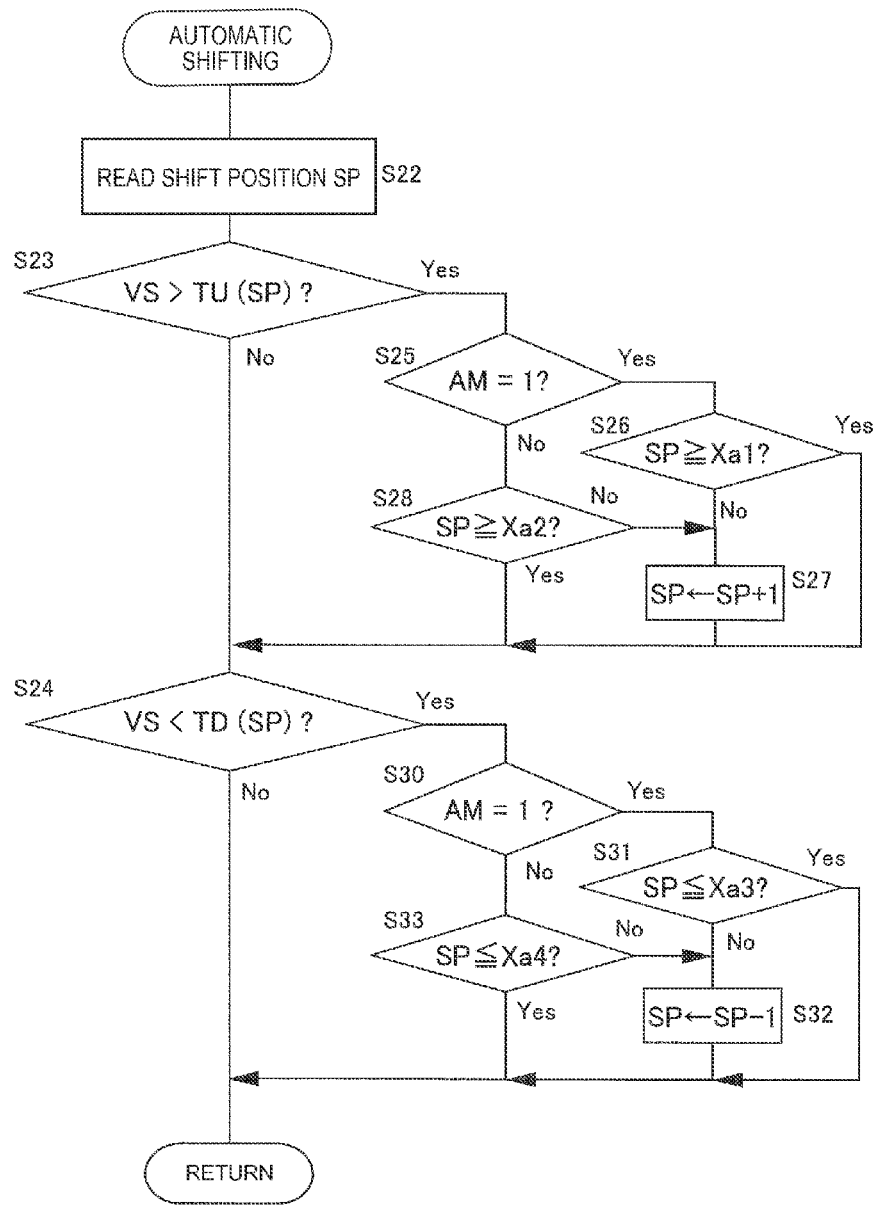
FIG. 5 is a flowchart showing one example an automatic shifting process of the control process when a gear changing range is defined by the shift position.

In Step S5, if the controller 4 determines that the current mode is in the automatic shifting mode, then the operation proceeds to the Step S12. In Step S12, the controller 4 executes the automatic shifting operation, as shown in FIG. 5. In Step S5, when a determination is made that the current mode is in the manual shifting mode, the operation proceeds to the Step S14. Once the automatic shifting process of Step S12 has been completed, the controller 4 proceeds to Step S2.

Figure 6:
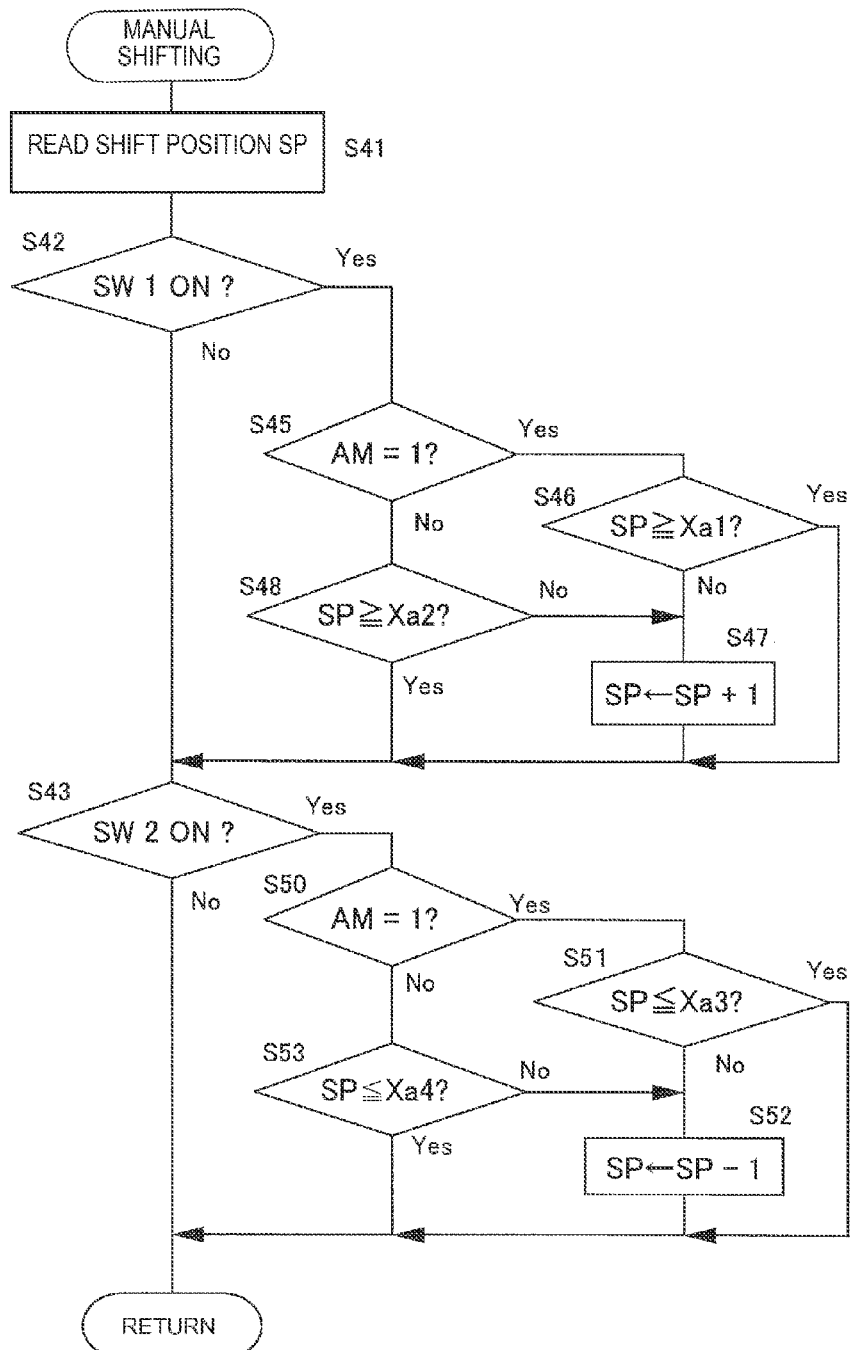
FIG. 6 is a flowchart showing one example of a manual shifting process of the control process when a gear changing range is defined by the shift position.

In Step S14, the controller 4 determines whether or not the speed VS of the bicycle is less than or equal to V1 km/h. Here, V1 shall be zero, so that the controller 4 determines whether or not the bicycle is stopped. If the controller 4 determines that the bicycle is not stopped in Step S14, that is, that the bicycle is not stopped, then the operation proceeds from Step S14 to Step S15. In Step S15, the controller 4 executes the manual shifting process, as shown in FIG. 6. Once the automatic shifting process of Step S13 has been completed, the controller 4 proceeds to Step S2.

If the controller 4 determines that the speed of the bicycle is less than or equal to V1 km/h in Step S14, then the operation proceeds from Step S14 to Step S19. In Step S19, the controller 4 determines whether or not the flag AM has been set. If the flag AM has been set and the operation mode has been set to the second mode, then the controller 4 advances the operation to Step S20. In Step S20, the controller 4 outputs a gear changing command that puts the shift position SP in the X1 shift position to the electric transmission 107. With this, when the current mode is in the second operation mode with a large auxiliary force, when the bicycle stops, shifting to the X1 shift position will occur.

When starting to travel after having been stopped, the gear shifting will be started from the X1 shift position. If the flag AM has been reset and the operation mode has been set to the first operation mode in Step S19, then the controller 4 proceeds to the Step S21. In Step S21, the controller 4 outputs a gear changing command to the electric transmission 107 that puts the shift position SP in the X2 shift position. With this, when the current mode is in the first operation mode with a small auxiliary force or with no auxiliary force, when the bicycle stops, shifting to the X2 shift position will occur. When starting to travel after having been stopped, the gear shifting will be started from the X2 shift position. The gear ratio of the X1 shift position is larger than the gear ratio of the X2 shift position.

In the automatic shifting process of FIG. 5, in Step S22, the controller 4 reads the current shift position SP from the gear number sensor 107c. In Step S23, the controller 4 determines whether or not the speed VS that was read in Step S4 exceeds an upshifting threshold value TU (SP) of the shift position SP that was read in Step S22. In the case that the speed VS does not exceed the upshifting threshold value TU (SP), the controller 4 proceeds from Step S23 to Step S24. In Step S24, the controller 4 determines whether or not the speed VS that was read in Step S4 is less than a downshifting threshold value TD (SP) of the shift position SP that was read in. In the case that the speed VS is not less than the downshifting threshold value TD (SP), since gear shifting is not necessary, the controller 4 proceeds to the shifting control Step S14 of FIG. 4.

In the case that the speed VS that was read in exceeds the upshifting threshold value TU (SP) of the shift position SP that was read in, the controller 4 proceeds from Step S23 to Step S25. In Step S25, the controller 4 determines whether or not the flag AM has been set, that is, whether or not the operation mode is the second operation mode. In the case that the operation mode is the second operation mode, the controller 4 proceeds from Step S25 to Step S26. In Step S26, a determination is made regarding whether or not the current shift position SP of the electric transmission 107 is greater than or equal to an Xa1 shift position. The Xa1 shift position is a shift position with the largest gear ratio within the gear changing range in the second operation mode. Xa1 is a positive integer that, in the present embodiment, is five and is the shift position with which the gear ratio becomes largest. In the case that the current shift position SP is greater than or equal to the Xa1 shift position, the controller 4 proceeds from Step S26 to Step S24 without further processing. In the case that the current shift position SP is not greater than or equal to the Xa1 shift position, the controller 4 proceeds from Step S26 to Step S27. In Step S27, the controller 4 outputs a command to the electric transmission 107 to shift the gears from the current shift position SP to a shift position that is upshifted one gear (SP+1) and proceeds to Step S24. In the case that the operation mode is the first operation mode, the controller 4 proceeds from Step S25 to Step S28. In Step S28, a determination is made regarding whether or not the current shift position SP is greater than or equal to an Xa2 shift position. The Xa2 shift position is a shift position with the largest gear ratio within the gear changing range in the first operation mode. Xa2 is a positive integer that, in the present embodiment, is four. In the first operation mode, since the gear changing range is limited from the first shift position to the fourth shift position, in the case that the current shift position SP is greater than or equal to the fourth shift position, the controller 4 proceeds from Step S28 to Step S24 without further processing. In the case that the current shift position SP is not greater than or equal to the fourth shift position, the controller 4 proceeds from Step S28 to Step S27 and outputs a gear changing command that upshifts one gear to the electric transmission 107.

In the case that the speed VS that was read in is less than the downshifting threshold value TD (SP) of the shift position SP that was read in, the controller 4 proceeds from Step S24 to Step S30. In Step S30, the controller 4 determines whether or not the flag AM has been set, that is, whether or not the operation mode is the second operation mode. In the case that the operation mode is the second operation mode, the controller 4 proceeds from Step S30 to Step S31. In Step S31, a determination is made regarding whether or not the current shift position SP of the electric transmission 107 is greater than or equal to an Xa3 shift position. The Xa3 shift position is a shift position with the smallest gear ratio within the gear changing range in the second operation mode. Xa3 is a positive integer that, in the present embodiment, is two. In the case that the current shift position SP is less than or equal to the Xa3 shift position, the controller 4 proceeds from Step S31 to Step S2 in FIG. 4 without further processing. In the case that the current shift position SP is not in the first shift position, the controller 4 proceeds from Step S31 to Step S32. In Step S32, the controller 4 outputs a command to the electric transmission 107 to shift gears from the current shift position to a shift position that is downshifted one gear and proceeds to Step S2 in FIG. 4. In the case that the operation mode is the first operation mode instead of the second operation mode, the controller 4 proceeds from Step S30 to Step S33. In Step S33, a determination is made regarding whether or not the current shift position SP is less than or equal to an Xa4 shift position. The Xa4 shift position is a shift position with the smallest gear ratio within the gear changing range in the first operation mode. Xa4 is a positive integer that, in the present embodiment, is one. In the first operation mode, since the gear changing range is limited from the first shift position to the fourth shift position, in the case that the current shift position SP is less than or equal to the Xa4 shift position, the controller 4 proceeds from Step S33 to Step S2 in FIG. 4 without further processing. In the case that the current shift position SP is not less than or equal to the Xa4 shift position, the controller 4 proceeds from Step S33 to Step S32 and outputs a gear changing command to the electric transmission 107 to downshift one gear.

In this way, the controller 4 controls the gear changing mechanism so that the minimum gear ratio of the gear changing range in the second operation mode with a large auxiliary force is larger than the minimum gear ratio of the gear changing range in the first operation mode during automatic shifting. The controller 4 also controls the gear changing mechanism so that the maximum gear ratio of the gear changing range in the second operation mode with a large auxiliary force is larger than the maximum gear changing ratio of the gear changing range in the first operation mode during automatic shifting. With this, improving the riding comfort is possible.

In another embodiment, the controller 4 can control the gear changing mechanism so that the minimum gear ratio of the gear changing range in the second operation mode is larger than the minimum gear ratio of the gear changing range in the first operation mode. The controller can also control the gear changing mechanism so that the maximum gear ratio of the gear changing range in the second operation mode and the maximum gear ratio of the gear changing range in the first operation mode are the same. Additionally, the controller 4 can control the gear changing mechanism so that the minimum gear ratio of the gear changing range in the second operation mode and the minimum gear ratio of the gear changing range in the first operation mode are the same. The controller can also control the gear changing mechanism so that the maximum gear ratio of the gear changing range in the second operation mode is larger than the maximum gear ratio of the gear changing range in the first operation mode.

In the manual shifting process of FIG. 6, in Step S41, the controller 4 reads the current shift position SP from the gear number sensor 107c. In Step S42, the controller 4 determines whether or not the first switch SW1 for the upshifting operation has been operated. In the case that the first switch SW1 has not been operated, the controller 4 proceeds from Step S42 to Step S43. In Step S43, the controller 4 determines whether or not the second switch SW2 for downshifting has been operated. In the case that the second switch SW2 has not been operated, the controller 4 proceeds to Step S2 in FIG. 4.

In the case that the first switch SW has been operated, the controller 4 proceeds from Step S42 to Step S45. Step S45 corresponds to Step S25 in the automatic shifting control of FIG. 5. Step S46 corresponds to Step S26 in the automatic shifting control of FIG. 5. Step S47 corresponds to Step S27 in the automatic shifting control of FIG. 5. Step S48 corresponds to Step S28 in the automatic shifting control of FIG. 5. Thus, the redundant explanations have been omitted. In Step S46, in the case that the controller 4 determines that the current shift position SP is greater than or equal to the Xa1 shift position, the operation proceeds to Step S43 without further processing. In Step S48, in the case that the controller 4 determines that the current shift position SP is greater than or equal to the Xa2 shift position, the operation proceeds to Step S43. Once Step S47 has been completed, the controller 4 proceeds to Step S43.

In the case that the second switch SW2 has been operated, the controller 4 proceeds from Step S43 to Step S50. Step S50 corresponds to Step S30 in the automatic shifting control of FIG. 5. Step S51 corresponds to Step S31 in the automatic shifting control of FIG. 5. Step S52 corresponds to Step S32 in the automatic shifting control of FIG. 5. Step S53 corresponds to Step S33 in the automatic shifting control of FIG. 5. Thus, the redundant explanations have been omitted. In Step S51, in the case that the controller 4 determines that the current shift position SP is less than or equal to the Xa3 shift position, the operation proceeds to Step S2 in FIG. 4 without further processing. In Step S53, in the case that the controller 4 determines that the current shift position SP is less than or equal to the Xa4 shift position, the operation proceeds to Step S2 in FIG. 4 without further processing. Once Step S52 has been completed, the controller 4 proceeds to Step S2 in FIG. 4.

Modified Example of the First Embodiment

The modified example differs from the first embodiment in the configuration of the gear changing mechanism and the operations of automatic shifting and manual shifting. In the modified example, the gear changing range is defined by the gear ratio. This shows a front sprocket FC, a rear sprocket CS, the number of teeth for each sprocket, and the gear ratios obtained by their combinations. The modified example uses an electric transmission comprising an electric front derailleur (not shown) that is configured to hang the chain to the front sprocket, as well as an electric rear derailleur (not shown) that is configured to hang the chain to, for example, ten rear sprockets. The electric front derailleur and the electric rear derailleur both comprise a gear number sensor that detects to which sprocket a chain guide is positioned, that is, the shift position. Here, there are three front sprockets, which comprise a first front sprocket Low, a second front sprocket Mid, and a third front sprocket Top gears. The rear sprocket comprises the first to the tenth rear sprockets RS1-RS10.

In the modified example, from combinations of the three front sprockets and the ten rear sprockets, as a whole, there are 30 shift positions. However, since there are many combinations with similar gear ratios, as well as combinations in which the chain will be greatly inclined, a prescribed shifting route is set by taking into consideration the change in the gear ratio, the inclination of the chain, and smooth usage frequency.

In the example shown in FIG. 7, the controller 4 will manually shift and will automatically shift the gear changing device in, for example, 14 gear ratios. For example, as shown in FIG. 7, when upshifting in order from the minimum gear ratio, the rear sprocket is changed in order from the first rear sprocket RS1 to the fifth rear sprocket RS5 while keeping the front sprocket at first front sprocket Low. If further upshifting occurs, then the front sprocket goes to the second front sprocket Mid, and the rear sprocket is changed in order from the fourth rear sprocket RS4 to the seventh rear sprocket RS7. If further upshifting occurs, then the front sprocket goes to the third front sprocket Top, and the rear sprocket is changed in order from the sixth rear sprocket RS6 to the tenth rear sprocket RS10. When downshifting, the sprockets are changed in the reverse order of the order for upshifting.

However, the prescribed shifting route shown in FIG. 7 is one example, and the prescribed shifting route can be set to various routes according to the number of shift positions and the gear changing range, etc. In this kind of modified example, since there are 14 shift positions, 13 upshifting threshold values are set corresponding to each shift position excluding the shift position with the maximum gear ratio, and 13 downshifting threshold values are set corresponding to each shift position excluding the shift position with the minimum gear ratio. In the same way as in the first embodiment, the upshifting threshold value from a certain gear ratio to a larger gear ratio is set to a gear ratio that is larger than the downshifting threshold value from the larger gear ratio to the certain gear ratio.

Additionally, the first operation mode is an operation mode in which, for example, the auxiliary force is "0", that is, in which an auxiliary force is not generated in the drive unit 2. The second operation mode is a mode that does generate an auxiliary force in the drive unit 2. The gear changing range differs between the first operation mode and the second operation mode. For example, in the first operation mode, the gear changing range is limited to eleven steps from, for example, gear ratio 0.67 to gear ratio 2.47. Also, in the second operation mode, the range is limited, for example, from gear ratio 1.00 to the maximum gear ratio 3.82. Meanwhile, in an exterior gear changing mechanism comprising a derailleur, since the gears in the gear changing device cannot be shifted when stopped, in the modified example, Steps S14 to S21 in FIG. 4 are not conducted.

Figure 8:
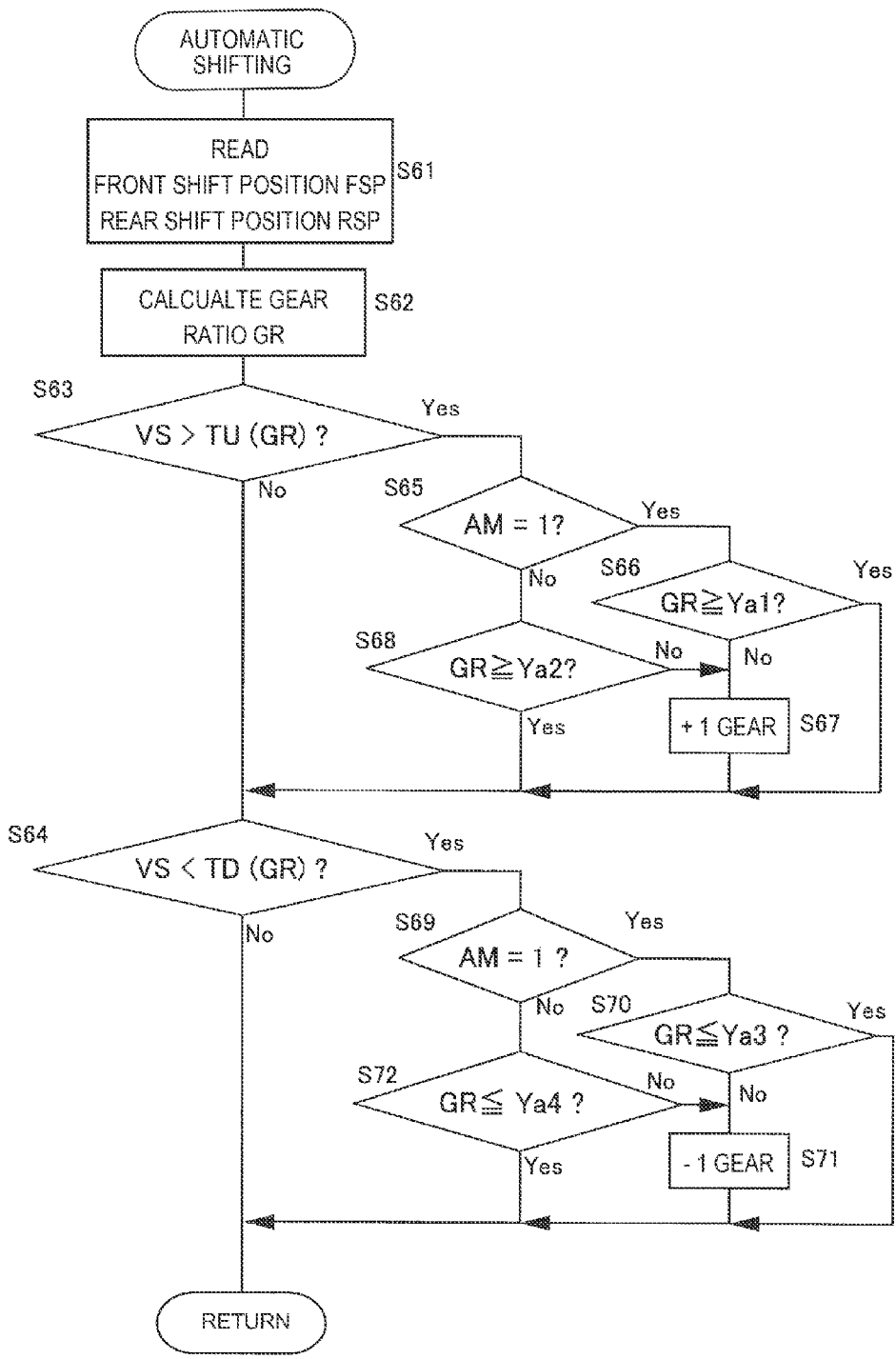
FIG. 8 is a diagram corresponding to FIG. 5 of a modified example of the first embodiment in the case that the gear changing range is defined by the gear ratio.

An automatic gear shift control of the modified example is shown in FIG. 8. In FIG. 8, in Step S61, the controller 4 reads information regarding the current shift position of the electric front derailleur (the front shift position FSP) and information regarding the current shift position of the electric rear derailleur (the rear shift position RSP), with a gear number sensor that is provided to the electric front derailleur and the electric rear derailleur. In Step S62, the controller 4 calculates the gear ratio GR based on the front shift position FSP and the rear shift position RSP. In Step S63, the controller 4 determines whether or not the speed VS that was read in Step S4 exceeds an upshifting threshold value TU (GR) of the gear ratio GR that was read in. In the case that the speed VS does not exceed the upshifting threshold value TU (GR), the controller 4 proceeds from Step S63 to Step S64. In Step S64, the controller 4 determines whether or not the speed VS that was read in Step S4 is less than a downshifting threshold value TD (GR) of the gear ratio GR that was read in. In the case that the speed VS is not less than the downshifting threshold value TD (GR), since gear shifting is not necessary, the controller 4 proceeds to the shifting control Step S14 of FIG. 4. Meanwhile, the calculation of the gear ratio can be done through arithmetic, and the gear ratio that is obtained by the combination of the front sprocket and the rear sprocket can be stored to a memory in the controller 4 beforehand and can be read out from the memory according to the combination.

In the case that the speed VS that was read in exceeds the upshifting threshold value TU (GR) of the gear ratio GR that was read in, the controller 4 proceeds from Step S63 to Step S65. In Step S65, the controller 4 determines whether or not the flag AM has been set, that is, whether or not the operation mode is the second operation mode. In the case that the operation mode is the second operation mode, the controller 4 proceeds from Step S65 to Step S66. In Step S66, a determination is made regarding whether or not the current gear ratio GR is greater than or equal to the maximum gear ratio Ya1 of the gear changing range of the second operation mode. In this modified example, Ya1 is "3.82". In the case that the current gear ratio GR is greater than or equal to "3.82", the controller proceeds from Step S66 to Step S64 without further processing. In the case that the current gear ratio is not greater than or equal to Ya1, the controller 4 proceeds from Step S66 to Step S67. In Step S67, the controller 4 outputs a command to the electric transmission to shift gears from the current gear ratio to a gear ratio that is upshifted by one gear and proceeds to Step S64. In the case that the operation mode is the first operation mode, the controller 4 proceeds from Step S65 to Step S68. In Step S68, a determination is made regarding whether or not the gear ratio GR is greater than or equal to the maximum gear ratio Ya2 of the gear changing range of the first operation mode. In this modified example, Ya2 is "2.47". In the case that the current gear ratio GR is greater than or equal to "2.47", the controller 4 proceeds from Step S68 to Step S64 without further processing. In the case that the current gear ratio GR is not greater than or equal to Ya2, the controller 4 proceeds from Step S68 to Step S67, outputs a gear changing command that shifts to a gear ratio that is upshifted one gear to the electric transmission, and proceeds to Step S14 of FIG. 4.

In the case that the speed VS that was read in is less than the downshifting threshold value TD (GR) of the gear ratio GR that was read in, the controller 4 proceeds from Step S64 to Step S69. In Step S69, the controller 4 determines whether or not the flag AM has been set, that is, whether or not the operation mode is the second operation mode. In the case that the operation mode is the second operation mode, the controller 4 proceeds from Step S69 to Step S70. In Step S70, a determination is made regarding whether or not the current gear ratio GR is less than or equal to the minimum gear ratio Ya3 of the gear changing range of the first operation mode of a prescribed shifting route. In this modified example, Ya3 is "1.00". In the case that the current gear ratio GR is less than or equal to "1.00", the controller 4 proceeds from Step S70 to Step S14 of FIG. 4 without further processing. In the case that the current gear ratio is not less than or equal to Ya3, the controller 4 proceeds from Step S70 to Step S71. In Step S71, the controller 4 outputs a command that shifts gears from the current gear ratio to a gear ratio that is downshifted one gear to the electric transmission in a prescribed shifting route, and then the controller proceeds to Step S14 of FIG. 4. In the case that the operation mode is the first operation mode, the controller 4 proceeds from Step S69 to Step S72. In Step S72, a determination is made regarding whether or not the current gear ratio GR is less than or equal to the minimum gear ratio Ya4 of the gear changing range of the first operation mode. In this modified example, Ya4 is "0.67". In the case that the current gear ratio GR is less than or equal to "0.67", the controller 4 proceeds from Step S72 to Step S14 of FIG. 4 without further processing. In the case that the current gear ratio GR is not less than or equal to Ya4, the controller 4 proceeds from Step S72 to Step S71 and outputs a gear changing command that shifts to a gear ratio that is downshifted one gear to the electric transmission.

Second Embodiment

In the second embodiment, in the automatic shifting mode, the gear changing frequency, rather than the gear changing range, is varied in the first operation mode and the second operation mode. Meanwhile, in the second embodiment, the automatic shifting process is executed by the shift position in the same way as in the first embodiment. Specifically, in order to vary the gear changing frequency according to the operation mode, in the case of automatic shifting, a first no-response time and a second no-response time from when a shifting condition is met to when gear shifting is actually conducted in relation to the operation mode are provided. The first no-response time T1 of the first operation mode is set to, for example, two seconds, and the second no-response time T2 of the second operation mode is set to, for example, five seconds. The first no-response time T1 is one example of a first parameter, and the second no-response time T2 is one example of a second parameter. With this, the gear changing frequency becomes lower when in the second operation mode than when in the first operation mode. The times of the first no-response time T1 and the second no-response time T2 (two seconds or five seconds) is one example, and the present invention is not limited to these values. A no-response time according to the operation mode is appropriately set according to the gear changing frequency of the bicycle. However, the second no-response time T2 of the second operation mode with a large auxiliary force is preferably longer than the first no-response time T1 of the first operation mode with a small auxiliary force.

Figure 9:
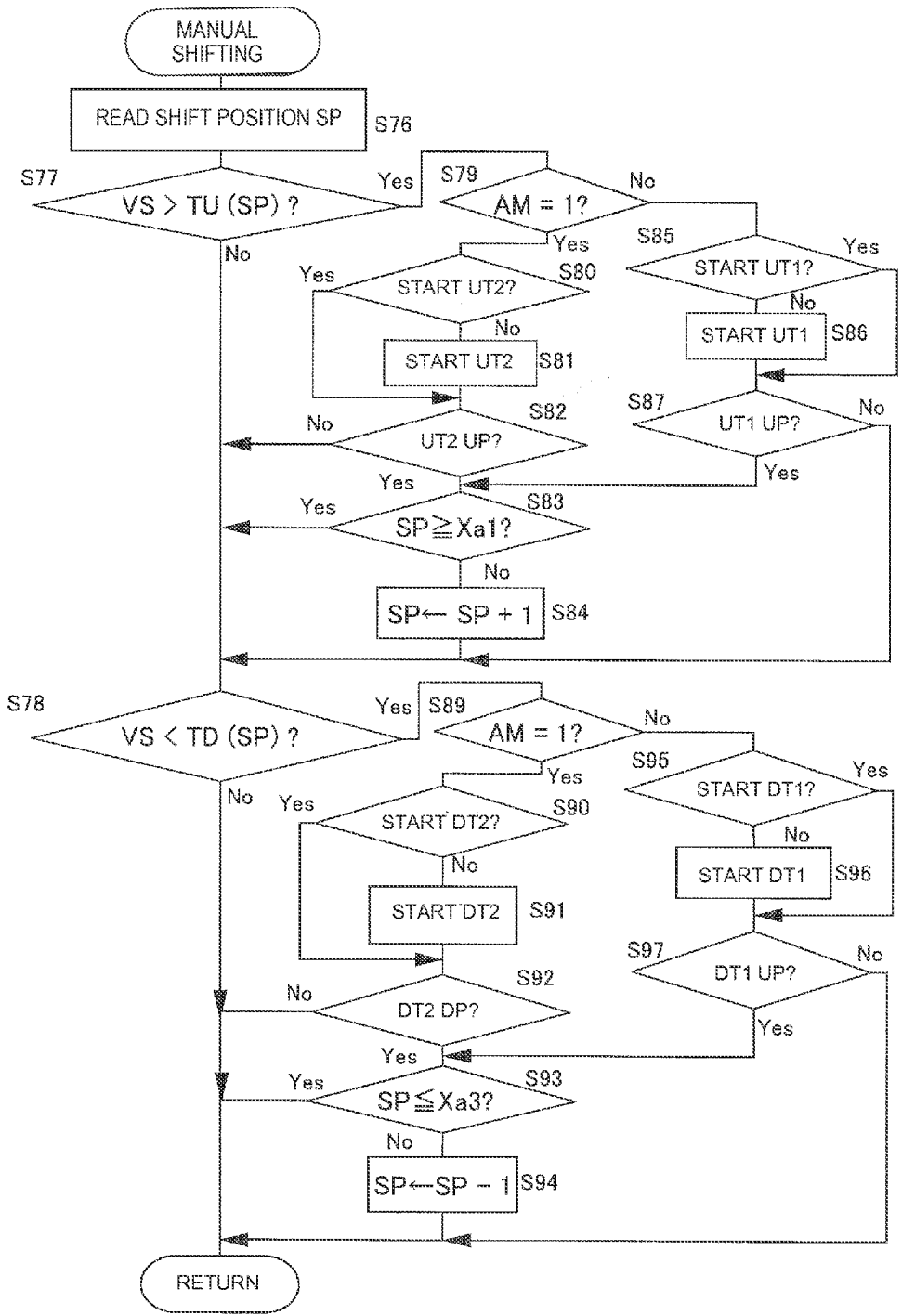
FIG. 9 is a diagram corresponding to FIG. 5, showing one example of an automatic shifting process of the control process according to a second embodiment.

In FIG. 9, in the automatic shifting mode according to the second embodiment of the present invention, in Step S76, the controller 4 reads the current shift position SP from the gear number sensor 107c. In Step S77, the controller 4 determines whether or not the speed VS that was read in Step S4 exceeds an upshifting threshold value TU (SP) of the shift position SP that was read in. In the case that the speed VS does not exceed the upshifting threshold value TU (SP), the controller 4 proceeds from Step S77 to Step S78. In Step S78, the controller 4 determines whether or not the speed VS that was read in Step S4 is less than a downshifting threshold value TD (SP) of the shift position SP that was read in. In the case that the speed VS is not less than the downshifting threshold value TD (SP), since gear shifting is not necessary, the controller 4 proceeds to the shifting control Step S14 of FIG. 4.

In the case that the speed VS that was read in exceeds the upshifting threshold value TU (SP) of the shift position SP that was read in, the controller 4 proceeds from Step S77 to Step S79. In Step S79, the controller 4 determines whether or not the flag AM has been set, that is, whether or not the operation mode is the second operation mode. In the case that the operation mode is the second operation mode, the controller 4 proceeds from Step S79 to Step S80. In Step S80, the controller 4 determines whether or not a timer UT2 that determines the shifting timing for upshifting when in the second operation mode has already started. The controller 4 comprises a timer UT2. The timer UT2 is provided to measure the second no-response time T2 of the upshifting when in the second operation mode. In the case that the timer UT2 has not yet started, the controller 4 proceeds from Step S80 to Step S81, starts the timer UT2, and proceeds to Step S82. In the case that the timer UT2 has already started, the controller 4 proceeds from Step S80 to Step S82, skipping Step S81. In Step S82, the controller 4 determines whether or not the timer UT2 has already started. In the case that the timer UT2 has not started, the controller 4 proceeds from Step S82 to Step S78 without further processing. In the case that the timer UT2 has already started, the controller 4 proceeds from Step S82 to Step S83 and determines whether or not the current shift position SP is greater than or equal to the Xa1 shift position. Meanwhile, the timer is reset when the timer starts. In the case that the shift position SP is greater than or equal to the Xa1 shift position, the controller 4 proceeds from Step S83 to Step S78 without further processing. In the case that the current shift position SP is not greater than or equal to the Xa1 shift position, the controller 4 proceeds from Step S83 to Step S84. In Step S84, the controller 4 outputs a command to the electric transmission 107 to shift gears from the current shift position SP to a shift position that is upshifted by one gear (SP+1) and proceeds to Step S14 of FIG. 4.

In the case that the operation mode is the first operation mode, the controller 4 proceeds from Step S79 to Step S85. In Step S85, the controller 4 determines whether or not a timer UT1 that determines the shifting timing for upshifting when in the first operation mode has already started. The controller 4 comprises a timer UT1. The timer UT1 is provided to measure the first no-response time T1 of the upshifting when in the first operation mode. In the case that the timer UT1 has not yet started, the controller 4 proceeds from Step S85 to Step S87, starts the timer UT1, and proceeds to Step S87. In the case that the timer UT1 has already started, the controller 4 proceeds from Step S85 to Step S87, skipping Step S86. In Step S87, the controller 4 determines whether or not the timer UT1 has already started. In the case that the timer UT1 has not started, the controller 4 proceeds from Step S87 to Step S78 without further processing. In the case that the timer UT1 has already started, the controller 4 proceeds from Step S87 to Step S83 and, henceforth, executes the same procedure as the second operation mode.

In the case that the speed VS that was read in is less than the downshifting threshold value TD (SP) of the shift position SP that was read in, the controller 4 proceeds from Step S78 to Step S89. In Step S89, the controller 4 determines whether or not the flag AM has been set, that is, whether or not the operation mode is the second operation mode. In the case that the operation mode is the second operation mode, the controller 4 proceeds from Step S89 to Step S90. In Step S90, the controller 4 determines whether or not a timer DT1 that determines the shifting timing for downshifting when in the second operation mode has already started. The controller 4 comprises a timer DT2. The timer DT2 is provided to measure the second no-response time T2 of the downshifting when in the second operation mode. In the case that the timer DT2 has not yet started, the controller 4 proceeds from Step S90 to Step S91, starts the timer DT2, and proceeds to Step S92. In the case that the timer DT2 has already started, the controller 4 proceeds from Step S90 to Step S92, skipping Step S91. In Step S92, the controller 4 determines whether or not the timer DT2 has already started. In the case that the timer DT2 has not started, the controller 4 proceeds from Step S92 to Step S14 of FIG. 4 without further processing. In the case that the timer DT2 has already started, the controller 4 proceeds from Step S92 to Step S93 and determines whether or not the current shift position SP is less than or equal to the Xa3 shift position. In the case that the shift position SP is less than or equal to the Xa3 shift position, the controller 4 proceeds from Step S93 to Step S14 in FIG. 4 without further processing. In the case that the current shift position SP is not less than or equal to the first shift position, the controller 4 proceeds from Step S93 to Step S94. In Step S94, the controller 4 outputs a command to the electric transmission 107 to shift gears from the current shift position SP to a shift position that is downshifted by one gear (SP−1) and then proceeds to Step S14 of FIG. 4.

In the case that the operation mode is the first operation mode, the controller 4 proceeds from Step S89 to Step S95. In Step S95, the controller 4 determines whether or not a timer DT1 that determines the shifting timing for downshifting when in the first operation mode has already started. The controller 4 comprises a timer DT1. The timer DT1 is provided to measure the first no-response time T1 of the downshifting when in the first operation mode. In the case that the timer DT1 has not yet started, the controller 4 proceeds from Step S95 to Step S97, starts the timer DT1, and proceeds to Step S97. In the case that the timer DT1 has already started, the controller 4 proceeds from Step S95 to Step S97, skipping Step S96. In Step S77, the controller 4 determines whether or not the timer DT1 has already started. In the case that the timer DT1 has not started, the controller 4 proceeds from Step S97 to Step S14 of FIG. 4 without further processing. In the case that the timer DT1 has already started, the controller 4 proceeds from Step S97 to Step S93 and, henceforth, executes the same procedure as the second operation mode.

Here, when automatic shifting, in the first operation mode and the second operation mode, the controller 4 configures the delay time (the no-response time) so that the gear ratio in the second operation mode with a large auxiliary force is larger than the first operation mode and so that the gear changing frequency of the second operation mode was decreased. With this, unnecessary gear shifting will be less likely to occur during automatic shifting, and improving the riding comfort in an assisted bicycle is possible.

Other Embodiments (a) In the first embodiment, limiting the gear changing range according to the operation mode is carried out in both shifting modes, automatic shifting and manual shifting, but the present invention is not limited to this configuration. For example, the gear changing range can be limited only to the case of automatic shifting. The gear changing range is shifted by the same number of gears in the first operation mode and the second operation mode, but the number of gears of the gear changing range can be different between the first operation mode and the second operation mode.

(b) In the first embodiment, the gear changing range is shifted by the same number of gears in the first operation mode and the second operation mode, but the number of gears of the gear changing range can be different between the first operation mode and the second operation mode. The gear changing range can also be varied between the automatic shifting mode and the manual shifting mode.

(c) In the modified example of the first embodiment, the gear changing range is made to be different for the first operation mode and the second operation mode by the gear ratio, with the automatic shifting mode as an example. However, also in the manual shifting mode, in the case of manual shifting in which the gear changing range can be made different between the first operation mode and the second operation mode, Step S63 in FIG. 8 should be made to be the same process as Step S42 in FIG. 6, and Step S64 in FIG. 8 should be made to be the same process as Step S43 in FIG. 6.

(d) In the second embodiment, the gear changing frequency was changed according to the operation mode by conducting the actual gear shifting with a delay after the shifting conditions were met in both shifting directions of downshifting and upshifting with an automatic shifting. However, the present invention is not limited to this configuration. For example, the gear changing frequency can be changed according to the operation mode in only one shifting direction of the automatic shifting (for example, in downshifting only).

(e) In the above-described first embodiment and second embodiment, there were two operation modes, but the present invention is not limited to this. There can be three or more operation modes. The operation mode can be, for example, a mode with no assisting, a mode with a weak auxiliary force, and a mode with a strong auxiliary force. In this case, the gear changing range (or the gear changing frequency) can be different in all of the operation modes, or at least one operation mode can have a different gear changing range (or gear changing frequency) from the rest of the plurality of operation modes.

(f) In the above-described first embodiment and second embodiment, the speed of the bicycle was selected as the traveling state, but the traveling state is not limited to the speed of the bicycle. For example, the cadence of the crank (the rotational speed of the crank), the pedaling force, and the inclination of the bicycle in the traveling direction can be made to be the traveling state. In the case of selecting the pedaling force as the traveling state, the controller 4 can control the gear changing device so that the gear ratio will become smaller as the pedaling force becomes larger. Additionally, in the case of selecting the cadence as the traveling state, the controller 4 can control the gear ratio of the gear changing device so that the cadence will be within a prescribed range. In the case of selecting the inclination as the traveling state, the controller 4 can control the gear changing device so that the gear ratio will become smaller as the inclination becomes larger.

(g) In the second embodiment, times have been set for the first no-response time T1 and the second no-response time T2 for upshifting and downshifting. However, a different time setting can be carried out for the downshifting and the upshifting. In this case, the no-response time during downshifting can be made to be longer than the no-response time during upshifting.

(h) In the above-described embodiment, the controller 4 is configured to switch between the automatic gear shift control and the manual gear shift control. However, the configuration can be such that the controller 4 comprises only the automatic gear shift control or such that the controller comprises only the manual gear shift control.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A gear changing control apparatus for controlling an auxiliary power device of a bicycle that assists a manual drive force, the gear changing control apparatus comprising:
    a gear changing controller that controls a gear changing device to operate in each of a manual shifting mode and an automatic shifting mode and controls the auxiliary power device to operate in one of a plurality of operation modes,
    the gear changing controller configured to select a gear changing range to be used according to a selected operation modes that was selected from the plurality of operation mode, the gear changing controller being further configured to control the gear changing device within the gear changing range that was selected.

2. The gear changing control apparatus as recited in claim 1, wherein
    the plurality of operation modes comprises a first operation mode and a second operation mode, and
    the gear changing controller is further configured to vary at least one of a maximum gear ratio and a minimum gear ratio to be used in the first operation mode and at least one of a maximum gear ratio and a minimum gear ratio to be used in the second operation mode.

3. The gear changing control apparatus as recited in claim 2, wherein
    the gear changing controller is further configured to control the gear changing device so that a maximum gear ratio available during the second operation mode is larger than a maximum gear ratio available during the first operation mode.

4. The gear changing control apparatus as recited in claim 2, wherein
    the gear changing controller is further configured to control the gear changing device so that the minimum gear ratio to be used during the second operation mode is larger than the minimum gear ratio to be used during the first operation mode.

5. The gear changing control apparatus as recited in claim 2, wherein
    the first operation mode is an operation mode that assists the manual drive force with a first auxiliary force, and
    the second operation mode is an operation mode that assists the manual drive force with a second auxiliary force that is larger than the first auxiliary force.

6. The gear changing control apparatus as recited in claim 2, wherein
    the first operation mode is an operation mode that does not make the auxiliary power device generate an auxiliary force, and the second operation mode is an operation mode that does make the auxiliary power device generate an auxiliary force.

7. The gear changing control apparatus as recited in claim 1, wherein
the gear changing range is defined by one of a gear ratio and a shift position.

8. The gear changing control apparatus as recited in claim 1, wherein
the gear changing controller is further configured to control the gear changing device according to a gear changing command.

9. A gear changing control apparatus for controlling an auxiliary power device of a bicycle that assists a manual drive force, the gear changing control apparatus comprising:
a gear changing controller that controls a gear changing device to operate in each of a manual shifting mode and an automatic shifting mode and controls the auxiliary power device to operate in one of a plurality of operation modes, the gear changing controller configured to control the gear changing device to one of a first gear changing state and a second gear changing state upon determining a speed of the bicycle becomes less than or equal to a prescribed value,
the gear changing controller being configured to control the gear changing device to the first gear changing state corresponding to a first operation mode of the plurality of operation modes when the auxiliary power device is in the first operation mode, and
the gear changing controller being configured to control the gear changing device to the second gear changing state that is different from the first gear changing state and corresponding to a second operation mode of the plurality of operation modes when the auxiliary power device is in the second operation mode.

10. The gear changing control apparatus as recited in claim 9, wherein
the prescribed value is 0.

11. The gear changing control apparatus as recited in claim 9, wherein
the gear ratio in the first gear changing state is smaller than the gear ratio in the second gear changing state.

12. The gear changing control apparatus as recited in claim 9, wherein
the first operation mode is an operation mode that assists the manual drive force with a first auxiliary force, and
the second operation mode is an operation mode that assists the manual drive force with a second auxiliary force that is larger than the first auxiliary force.

13. The gear changing control apparatus as recited in claim 9, wherein
the first operation mode is an operation mode that does not make the auxiliary power device generate an auxiliary force, and
the second operation mode is an operation mode that does make the auxiliary power device generate the auxiliary force.

14. The gear changing control apparatus as recited in claim 9, wherein
the gear changing controller controls the gear changing device to a preset first shift position when in the first operation mode, and the controller controls the gear changing device to a preset second shift position when in the second operation mode.

15. The gear changing control apparatus as recited in claim 14, further comprising
an input unit operatively coupled to the gear changing controller and configured to adjust at least one of the preset first shift position and the preset second shift position.

16. The gear changing control apparatus as recited in claim 1, wherein
the controller is electrically connected to a gear shifting unit that comprises at least one switch configured to switch between the manual shifting mode and the automatic shifting mode.

17. The gear changing control apparatus as recited in claim 1, wherein
the controller is electrically connected to a gear shifting unit that comprises at least one switch configured to switch between the manual shifting mode and the automatic shifting mode.

* * * * *